UNITED STATES PATENT OFFICE.

AXEL THEODOR KONSTANTIN ESTELLE, OF FLISERYD, SWEDEN, ASSIGNOR TO NYA ACKUMULATOR AKTIEBOLAGET JUNGNER, OF FLISERYD, SWEDEN.

PROCESS OF MANUFACTURING IRON ELECTRODES FOR USE IN ALKALINE ACCUMULATORS.

983,430.   Specification of Letters Patent.   Patented Feb. 7, 1911.

No Drawing.   Application filed March 19, 1910.  Serial No. 550,493.

*To all whom it may concern:*

Be it known that I, AXEL THEODOR KONSTANTIN ESTELLE, engineer, of Fliseryd, Sweden, a citizen of Sweden and a subject of the King of Sweden, have invented certain new and useful Improvements in the Process of Manufacturing Iron Electrodes for Use in Alkaline Accumulators; and I do hereby declare the following to be a full, clear, and exact description of the invention, such as will enable others skilled in the art to which it appertains to make and use the same.

The manufacture of an iron mass suitable as active material in negative electrodes of alkaline accumulators has hitherto been connected with some difficulties on account of the tendency of the iron to oxidize in the air and also on account of the high oxygen compounds of this metal being scarcely reducible. A condition for the greatest possible conductivity is that the metal used is in a chemically finely divided state, when the electrode is fully prepared or charged. As iron, however, in that state is pyrophoric, it cannot directly be used for the purpose indicated.

I have discovered that, if iron is electrolytically precipitated from a salt solution in the presence of a solution of certain other metals, a spongy alloy in finely divided state of iron and the other metal will be formed, which alloy possesses special properties and can be advantageously used as active material in negative electrodes. The additional metal used may be one which is insoluble by anode-electrolysis in alkaline solutions. As an example of such a metal cadmium may be mentioned.

I prepare an iron-cadmium electrode in the following way: I take a concentrated solution of ferrous sulfate and mix the same with a solution of cadmium sulfate and I introduce this mixture in an electrolyzing apparatus. The proportions may be such as to correspond to the composition of the metal alloy desired. For the anodes, plates of iron and cadmium may be used, said plates being so adapted that the effective surfaces are in direct ratio to the proportions of the metals of the alloy but in inverse ratio to the atomic weight of the metals. If, for instance, the alloy is to contain two parts of iron and one part of cadmium, the effective anode surface of the iron, seeing that the atomic weight of the ferrous iron is only a half of that of cadmium, may be four times as great as that of the cadmium. For the cathode, plates of iron or cadmium are suitably used, the current density being about 10 amperes per square decimeter. The precipitated alloy is further washed, pressed to cakes in a hydraulic press and dried at a temperature of 50° to 60° C. The alloy is then ground into a coarse powder, formed into bricks and introduced in perforated sheet metal pockets. After having been subjected to cathode electrolysis for reduction of the small quantities of oxid formed during the washing and drying processes, the electrode is then ready for use. Each grain of the coarse powder thus produced represents a conglomerate of very fine metallic parts, and the cadmium particles are in a sufficiently subdivided state to act as active material. But as soon as this action takes place, the iron particles disengage from the alloy as very finely divided particles, which possess a high degree of activity.

With an alloy containing 56.5 per cent. of cadmium and 43.5 per cent. of iron I have obtained a capacity of 1 ampere hour for each 3.54 grams of the alloy, corresponding to 82.3 per cent. of the greatest obtainable capacity.

As will be understood, the active material produced according to the method described above will be in a metallic state, thus having a high weight per unit of volume, the consequence being that a relatively great quantity of the same may be introduced in an electrode of determined space.

I claim:—

1. A process for manufacturing an electrically active iron mass for negative electrodes of alkaline accumulators, which consists in subjecting a solution of an iron salt to electrolysis in the presence of a solution of another metal insoluble in alkaline solutions.

2. A process for manufacturing an electrically active iron mass for negative electrodes of alkaline accumulators, which consists in subjecting a solution of an iron salt to electrolysis in the presence of a solution of another metal insoluble in alkaline solutions and forming a spongy alloy with the precipitated iron.

3. A process for manufacturing an electrically active iron mass for negative electrodes of alkaline accumulators, which consists in subjecting a solution of ferrous-sulfate to electrolysis in the presence of a solution of another metal insoluble in alkaline solutions and forming a spongy alloy with the precipitated iron.

4. A process for manufacturing an electrically active iron mass for negative electrodes of alkaline accumulators, which consists in subjecting a solution of an iron salt to electrolysis in the presence of a solution of a cadmium salt.

5. A process for manufacturing an electrically active iron mass for negative electrodes of alkaline accumulators, which consists in subjecting a solution of ferrous-sulfate to electrolysis in the presence of a solution of a cadmium salt.

6. A process for manufacturing an electrically active iron mass for negative electrodes of alkaline accumulators, which consists in subjecting a solution of ferrous sulfate to electrolysis in the presence of a solution of cadmium sulfate.

7. A process for manufacturing an electrically active iron mass for negative electrodes of alkaline accumulators, which consists in subjecting a solution of an iron salt to electrolysis in the presence of a solution of another metal insoluble in alkaline solutions, washing the precipitated alloy, pressing and drying the same, molding the dry product to a powder and compressing said powder into bricks.

8. A process of manufacturing an electrically active iron mass for negative electrodes of alkaline accumulators, which consists in subjecting a solution of ferrous-sulfate to electrolysis in the presence of a solution of cadmium-sulfate, washing the precipitated iron-cadmium alloy, pressing and drying the same, molding the dry product to a powder and compressing said powder into bricks.

In testimony that I claim the foregoing as my invention, I have signed my name in presence of two subscribing witnesses.

AXEL THEODOR KONSTANTIN ESTELLE.

Witnesses:
TORVALD NYSTROM,
HARRY ALBILEN.